(12) United States Patent
Chen et al.

(10) Patent No.: US 9,819,196 B2
(45) Date of Patent: Nov. 14, 2017

(54) POWER DISTRIBUTION SYSTEM CAPABLE OF AUTOMATIC FAULT DETECTION IN A DISTRIBUTED MANNER AND METHOD THEREOF

(71) Applicant: I SHOU UNIVERSITY, Kaohsiung (TW)

(72) Inventors: Chao-Shun Chen, Kaohsiung (TW); Te-Tien Ku, Kaohsiung (TW); Chia-Hung Lin, Kaohsiung (TW); Cheng-Ting Hsu, Kaohsiung (TW)

(73) Assignee: I Shou University, Kaohsiung (TW)

( * ) Notice: Subject to any disclaimer, the term of this patent is extended or adjusted under 35 U.S.C. 154(b) by 101 days.

(21) Appl. No.: 14/731,627

(22) Filed: Jun. 5, 2015

(65) Prior Publication Data

US 2016/0359333 A1 Dec. 8, 2016

(51) Int. Cl.
*H02H 9/02* (2006.01)
*H02J 4/00* (2006.01)
*H02H 3/08* (2006.01)
*H02H 7/26* (2006.01)

(52) U.S. Cl.
CPC ............. *H02J 4/00* (2013.01); *H02H 3/083* (2013.01); *H02H 7/262* (2013.01); *H02H 9/02* (2013.01)

(58) Field of Classification Search
CPC .......... H02H 7/006; H02H 9/02; H02H 3/083; H02H 7/262
USPC ............................................ 307/43
See application file for complete search history.

(56) References Cited

U.S. PATENT DOCUMENTS

2013/0271879 A1* 10/2013 Andersen ................. B63J 3/00
361/20

* cited by examiner

*Primary Examiner* — Robert Deberadinis
(74) *Attorney, Agent, or Firm* — Fox Rothschild LLP; Robert J. Sacco; Carol E. Thorstad-Forsyth

(57) ABSTRACT

A power distribution system capable of automatic fault detection includes a lateral, a switch unit and a feeder terminal unit. The switch unit includes a circuit breaker coupled for transmitting electrical power to the lateral when making electrical connection, and a protection relay to provide a control signal that causes the circuit breaker to break electrical connection upon determining that the magnitude of a current provided by the circuit breaker is greater than a threshold current value. The feeder terminal unit detects whether or not the protection relay generates the control signal, so as to determine whether or not a fault has occurred in the lateral.

14 Claims, 7 Drawing Sheets

POWER DISTRIBUTION SYSTEM CAPABLE OF AUTOMATIC FAULT DETECTION IN A DISTRIBUTED MANNER AND METHOD THEREOF

FIELD

The disclosure relates to a power distribution system, and more particularly to a power distribution system capable of automatic fault detection in a distributed manner.

BACKGROUND

A conventional power distribution system usually includes a supervisory control and data acquisition (SCADA) system, a plurality of 4-way switch units and a plurality of laterals. Each 4-way switch unit is coupled between the SCADA system and multiple laterals, and each lateral is coupled to multiple loads. The SCADA system may control feeding of electrical power to the loads through the 4-way switches and the corresponding laterals, and continuously detect operation of each of the 4-way switch units. The SCADA system is able to identify one of the 4-way switch units to which a lateral that has a fault is coupled, in order to perform fault detection, isolation and restoration (FDIR) on the faulted lateral.

The FDIR process of the conventional power distribution system may have the following drawbacks:

1. The power distribution system is unable to promptly become aware of the occurrence of a fault and thus FDIR cannot be performed speedily: since each of the 4-way switch units is coupled to the SCADA system, the SCADA system must monitor operation of each of the 4-way switch unit in order to identify the 4-way switch unit coupled to the faulted lateral for subsequent manual execution of the FDIR on that lateral, thereby delaying completion of FDIR.

2. Complex program design: since each of the 4-way switch units and the laterals is directly detected and controlled by the SCADA system, program design for the SCADA system is rather complicated.

SUMMARY

Therefore, an object of the disclosure is to provide a power distribution system that may quickly detect occurrence of a fault with a relatively simple program design.

According to the disclosure, the power distribution system includes at least one lateral, at least one switch unit and at least one feeder terminal unit (FTU). The switch unit includes a circuit breaker coupled to the lateral for transmitting electrical power to the lateral when making electrical connection, and a protection relay coupled to the circuit breaker, and configured to detect whether or not a magnitude of a current provided by the circuit breaker is greater than a threshold current value, and to generate, upon determining that the magnitude of the current is greater than the threshold current value, a control signal that causes the circuit breaker to break electrical connection. The FTU is coupled to the switch unit, and is configured to detect whether or not the protection relay generates the control signal, and to determine whether or not a fault has occurred in the lateral according to the detection.

Another object of the disclosure is to provide a fault detection method for the power distribution system of this disclosure.

According to the disclosure, the fault detection method is provided for a power distribution that includes at least one lateral, at least one switch unit and at least one feeder terminal unit (FTU). The switch unit includes a circuit breaker coupled to the lateral for transmitting electrical power to the lateral when making electrical connection, and a protection relay coupled to the circuit breaker. The fault detection method includes the steps of: a) detecting, by the protection relay, whether or not a magnitude of a current provided by the circuit breaker is greater than a threshold current value; b) generating, by the protection relay, a control signal that causes the circuit breaker to break electrical connection upon determining that the magnitude of the current is greater than the threshold current value in step a); and c) determining, by the FTU, whether or not a fault has occurred in the lateral by detecting whether or not the protection relay generates the control signal.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
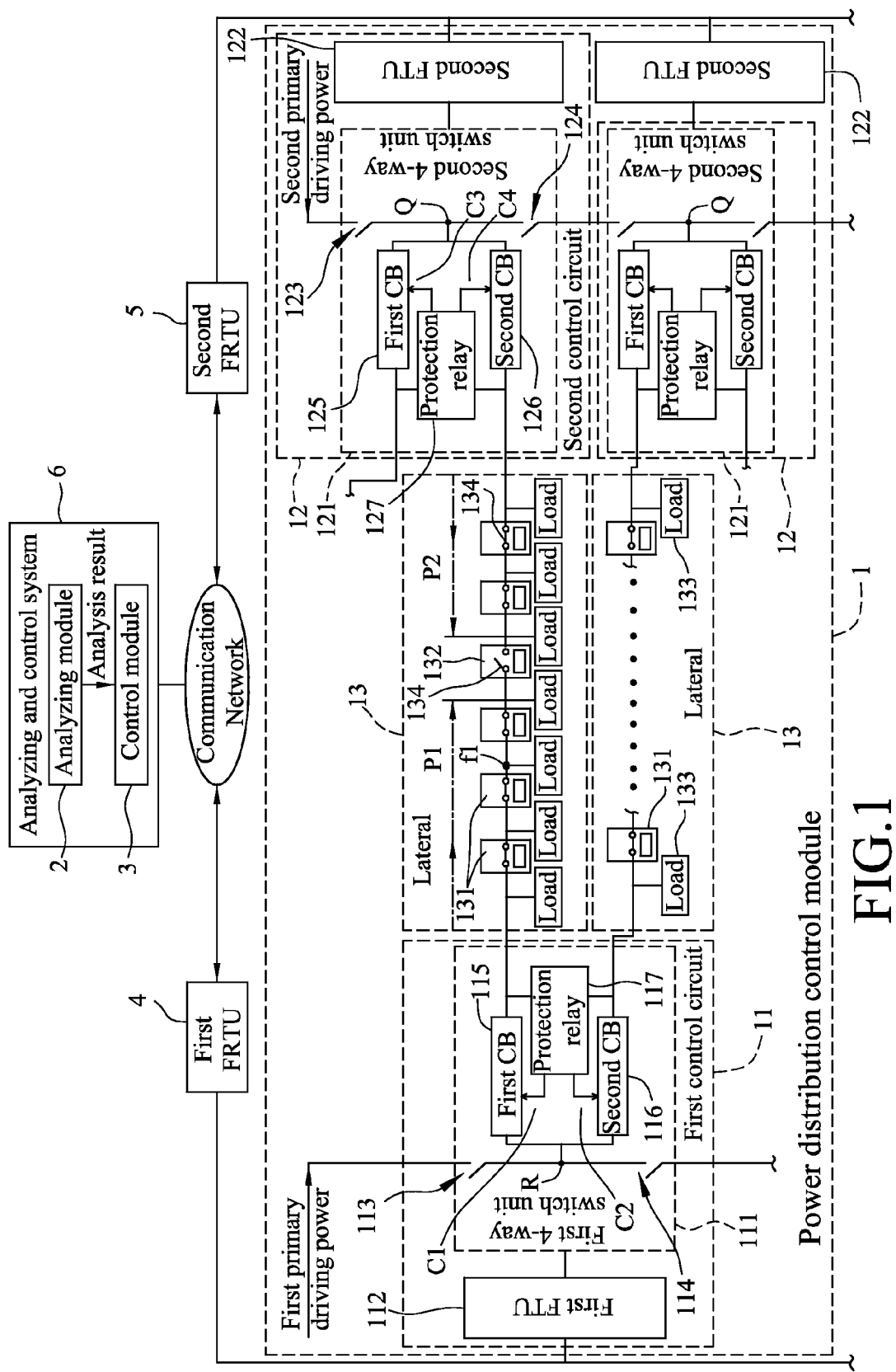
FIG. 1 is a fragmentary block diagram illustrating the embodiment of a power distribution system with distributed fault detection according to the disclosure, where laterals of the power distribution system are in a first exemplary condition.
Figure 2:
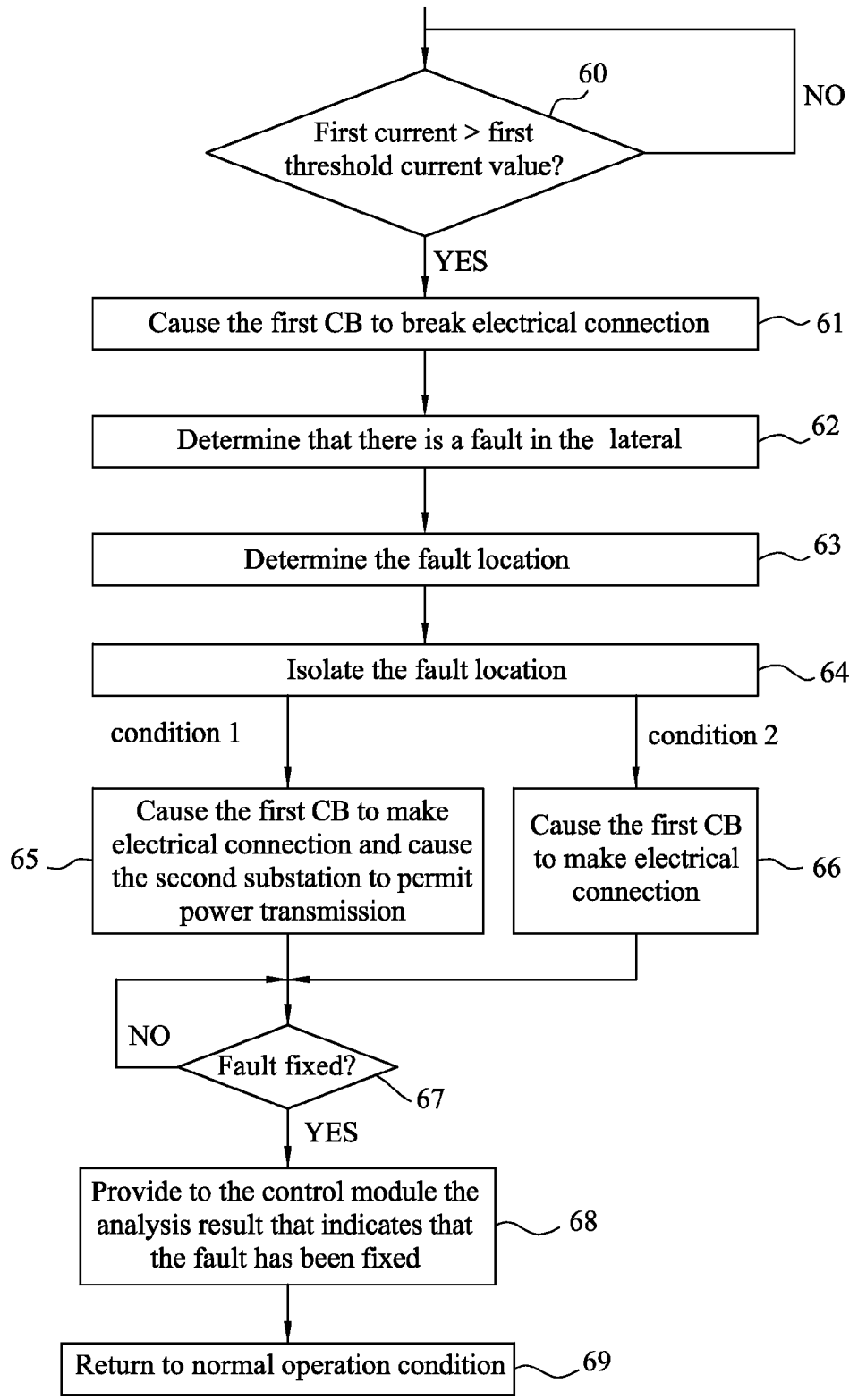
FIG. 2 is a flow chart illustrating steps of a distributed fault detection method implemented by the embodiment.

Before the disclosure is described in greater detail, it should be noted that like elements are denoted by the same reference numerals throughout the disclosure.

Referring to FIG. 1, an embodiment of the power distribution system with distributed fault detection according to this disclosure is shown to include at least one power distribution control module 1, an analyzing and control system 6, a first feeder remote terminal unit (FRTU) 4 and a second FRTU 5. In this embodiment, there is only one power distribution control module 1; however, this disclosure is not limited in terms of the number of the power distribution control module 1.

The power distribution control module 1 includes a number (M) of first control circuits 11 coupled to each other one by one in series, a number (N) of second control circuits 12 coupled to each other one by one in series, and a number (L) of laterals 13, where each of M, N and L is a positive integer. Each first/second control circuit 11, 12 has a first output terminal and a second output terminal, and each lateral 13 has a first terminal and a second terminal. In this embodiment, M<N and L=2M, where M=1, N=2 and L=2, but the disclosure is not limited thereto.

Each first control circuit 11 outputs a first driving power and a second driving power respectively at the first and second output terminals thereof, where the first driving power and the second driving power are associated with a first primary driving power provided by a power substation (not shown). In this embodiment, each first control circuit 11 includes a first 4-way switch unit 111 and a first feeder terminal unit (FTU) 112.

For each first control circuit 11, the first 4-way switch unit 111 thereof includes two switch elements 113, 114 that are coupled in series and that are closed in a normal condition (i.e., faultless condition), a first circuit breaker (CB) 115, a second CB 116 and a protection relay 117. Each of the first and second CBs 115, 116 has a first terminal coupled to a common node (R) of the switch elements 113, 114, and a second terminal serving as a respective one of the first and second output terminals of the first control circuit 11 at which the corresponding one of the first and second driving power is outputted. The protection relay 117 is coupled between the second terminals of the first and second CBs 115, 116 for detecting a first/second current (resulting from the first/second driving power) provided by the first/second CB 115/116, and determines whether or not a magnitude of the first/second current is greater than a first/second threshold current value (i.e., a short-circuit fault). When the determination for the first/second current is affirmative, the protection relay 117 generates a first/second control signal (C1/C2), and provides the first/second control signal (C1/C2) to the corresponding first/second CB 115, 116, to thereby cause the corresponding first/second CB 115, 116 to break electrical connection thereof.

The first FTU 112 is coupled to the first 4-way switch unit 111, detects whether or not the protection relay 117 generates the first and/or second control signals (C1, C2), and determines whether a fault has occurred according to the detection. Specifically, when it is detected that the protection relay 117 generates the first and/or second control signals (C1, C2), the first FTU 112 determines that a fault has occurred.

When M<N, as with this embodiment, each of the first output terminal of a first one of the second control circuits 12 and the second output terminal of an $N^{th}$ one of the second control circuits 12 may be coupled to a corresponding circuit unit (not shown), which may be a lateral or other circuits. For other output terminals of the second control circuits 12, power outputted at each first output terminal is called a third driving power, and power outputted at each second output terminal is called a fourth driving power, where the third driving power and the fourth driving power are associated with a second primary driving power which may be provided by another power substation (not shown). In this embodiment, each of the second control circuits 12 includes a second 4-way switch unit 121 and a second FTU 122, and the second 4-way switch units 121 of the second control circuits 12 are, but not limited to, coupled to each other one by one in series.

For each second control circuit 12, the second 4-way switch unit 121 thereof includes two switch elements 123, 124, a first CB 125, a second CB 126 and a protection relay 127. Each of the first and second CBs 125, 126 has a first terminal coupled to a common node (Q) of the switch elements 123, 124, and a second terminal serving as a corresponding one of the first and second output terminals of the second control circuit 12 at which the corresponding one of the third and fourth driving power is outputted. The protection relay 127 is coupled between the second terminals of the first and second CBs 125, 126 for detecting a third/fourth current provided by the first/second CB 125/126, and determines whether or not a magnitude of the third/fourth current (resulting from the third/fourth driving power) is greater than a third/fourth threshold current value. When the determination for the third/fourth current is affirmative, the protection relay 127 generates a third/fourth control signal (C3/C4), and provides the third/fourth control signal (C3/C4) to the corresponding first/second CB 125, 126, to thereby cause the corresponding first/second CB 125, 126 to break electrical connection thereof.

The second FTU 122 is coupled to the second 4-way switch unit 121, and detects whether or not the protection relay 127 generates the third and/or fourth control signals (C3, C4), so as to determine whether a fault occurs.

When M<N, the first and second terminals of a $(2i-1)^{th}$ one of the laterals 13 are respectively coupled to the first output terminal of an $i^{th}$ one of the first control circuit(s) 11 and the second output terminal of an $i^{th}$ one of the second control circuits 12 for respectively receiving the first driving power and the fourth driving power therefrom, where $1 \leq i \leq M$. The first and second terminals of a $(2i)^{th}$ one of the laterals 13 are respectively coupled to the second output terminal of the $i^{th}$ first control circuit 11 and the first output terminal of an $(i+1)^{th}$ one of the second control circuits 12 for respectively receiving the second driving power and the third driving power therefrom. Each lateral 13 includes a plurality of first sub-switch units 131 that are divided into a first switch group and a second switch group, a second sub-switch unit 132 between the first switch group and the second switch group, and a number (Y) of loads 133, where Y is a positive integer. In this embodiment, the number of the first sub-switch units 131 is five and Y=7, but this disclosure is not limited thereto.

Figure 7:
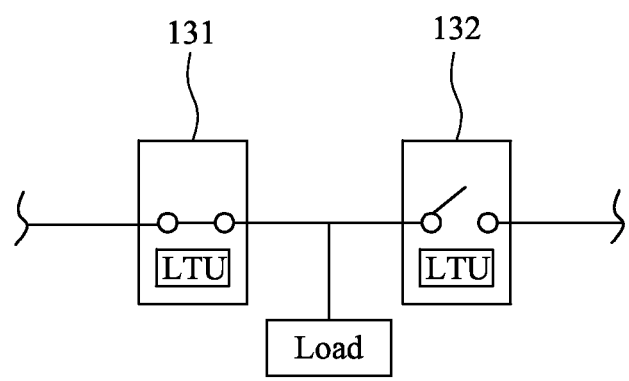
FIG. 7 is a fragmentary block diagram illustrating a first sub-switch unit and a second sub-switch unit of the embodiment.

For each lateral 13, each of the first and second sub-switch units 131, 132 includes a lateral terminal unit (LTU, see FIG. 7) that continuously provides to the corresponding first and second FTU(s) 112, 122 a fault detection signal that indicates an operation condition of the respective first or second sub-switch unit 131, 132, and a 2-way switch 134. Particularly, for each of the first and second sub-switch units 131, 132, the LTU may detect a current information associated with the 2-way switch 134, and generate a fault flag to serve as the fault detection signal upon detecting that the current information thus detected is abnormal (e.g., a current thus detected falls outside of a predetermined range). The 2-way switches 134 of the first and second sub-switch units 131, 132 are electrically coupled in series, and the 2-way switch 134 of the second sub-switch unit 132 interconnects the 2-way switch 134 of a terminal of the first sub-switch units 131 of the first switch group and the 2-way switch 134 of a terminal of the first sub-switch units 131 of the second switch group. In this embodiment, the LTUs respectively detect currents flowing through the 2-way switches 134, thereby providing the fault detection signals to the first and second FTUs 112, 122. The 2-way switches 134 of the first sub-switch units 131 of the first switch group are coupled to each other one by one between the first terminal of the lateral 13 and the 2-way switch 134 of the second sub-switch unit 132 to form a first conduction path (P1), while the 2-way switches 134 of the first sub-switch units 131 of the second switch group are coupled to each other one by one between the second terminal of the lateral 13 and the 2-way switch 134 of the second sub-switch unit 132 to form a second conduction path (P2). In this embodiment, the first switch group has three first sub-switch units 131, and the second switch group has two first sub-switch units 131, but this disclosure is not limited thereto. In this embodiment, when the lateral 13 operates in the normal/faultless condition, each of the first sub-switch units 131 permits power transmission therethrough, and the second sub-switch unit 132 disables power transmission therethrough. In other words, in the normal condition, the 2-way switches 134 of the first sub-switch units 131 are closed and the switch 131 of the second sub-switch unit 132 is open.

For each lateral 13, $1^{st}$ and $Y^{th}$ ones of the loads 133 are respectively coupled to the first and second terminals of the lateral 13, and each of second to $(Y-1)^{th}$ ones of the loads 133 is coupled to a respective pair of adjacent sub-switch units 131, 132. The loads 133 of each lateral 13 receive corresponding first or second driving power via the first conduction path (P1), or receive corresponding third or fourth driving power via the second conduction path (P2).

In this embodiment, the analyzing and control system 6 may be a supervisory control and data acquisition (SCADA) system, and includes an analyzing module 2 to collect, via a communication network (e.g., a fiber network), information (e.g., electric current information) of the laterals 13 via a hierarchical structure of the first and second FRTUs 4, 5, the first and second FTUs 112, 122 and LTUs for analysis, thereby generating an analysis result, and a control module 3 to control operations of the first and second FTUs 112, 122 according to the analysis result.

In a first exemplary condition depicted in FIG. 1, a fault occurs at a fault location (f1) in the first conduction path (P1) of a first one of the laterals 13.

FIGS. 1, 2 and 3A to 3D are used to cooperatively illustrate the embodiment of a distributed fault detection method implemented by the power distribution system when the laterals 13 are in the first exemplary condition. It is noted that, in FIGS. 3A to 3D, the first CB 115 is exemplified using a switch, and the distributed fault detection method is described using only the first control circuit 11 and the corresponding first conduction path (P1) for the sake of brevity, but this disclosure is not limited thereto. The first control circuit 11 may perform FDIR on the first conduction path (P1) of the first lateral 13 according to the distributed fault detection method, which includes the following steps 60-69.

Step 60: The protection relay 117 detects whether or not the magnitude of the first current provided by the first CB 115 is greater than the first threshold current value. The flow goes to step 61 when the determination is affirmative, and goes back to step 60 when otherwise.

Step 61: The protection relay 117 generates the first control signal (C1) that is provided to the first CB 115 and that causes the first CB 115 to break electrical connection (see FIG. 3A).

Step 62: Upon detecting that the protection relay 117 has generated the first control signal (C1), the first FTU 112 determines that there is a fault with the lateral 13, and the flow goes to step 63.

Step 63: The first FTU 112 determines the fault location (f1) of the lateral 13 at which the fault occurs according to the fault detection signal received from each of the first and second sub-switch units 131, 132 before the first CB 115 breaks electrical connection, and the flow goes to step 64.

For example, before the first CB breaks electrical connection, if the fault detection signal generated by a third one of the first sub-switch units 131 is different from those generated by first, second, fourth and fifth ones of the first sub-switch unit 131 and the second sub-switch unit 132, which are the same thereamongst, the first FTU 112 determines that the fault location (f1) is between the second and third ones of the first sub-switch units 131 according to the fault detection signals generated by the sub-switch units 131, 132. Note that the first and fifth ones of the first sub-switch units 131 refer to the leftmost and rightmost ones of the first sub-switch units 131, respectively, as depicted in the drawings.

Figure 3A:
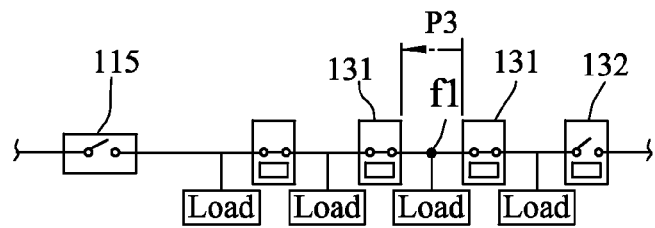
FIGS. 3A to 3D are fragmentary block diagrams illustrating operations of a protection relay, two first sub-switch units and a second sub-switch unit of the embodiment during fault detection.
Figure 3B:
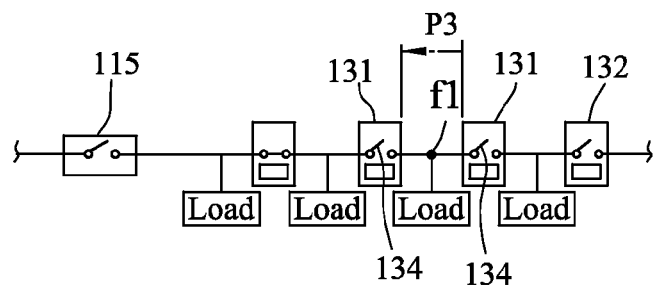

Step 64: The first FTU 112 causes the 2-way switches 134 of two of the first sub-switch units 131 that are located most adjacent to the fault location (f1) along the one-by-one serial connection to break electrical connections, to thereby disable power transmission through those two first sub-switch units 131 when at least one of the first sub-switch units 131 is located between the fault location (f1) and the second sub-switch unit 132, as shown in FIG. 3B (condition 1), and the flow goes to step 65. When none of the first sub-switch units 131 is located between the fault location (f1) and the second sub-switch unit 132, i.e., the fault location (f1) is located most adjacent to the second sub-switch unit 132 and one of the first sub-switch units 131 (condition 2), the first FTU 112 causes only the 2-way switch 134 of said one of the first sub-switch units 131 to break electrical connection, to thereby disable power transmission through that first sub-switch unit 131, and the flow goes to step 66. In other words, the fault location (f1) is isolated as a consequence of step 64. After completion of step 64, maintenance technicians may immediately perform maintenance/repair at the fault location (f1).

Figure 3C:
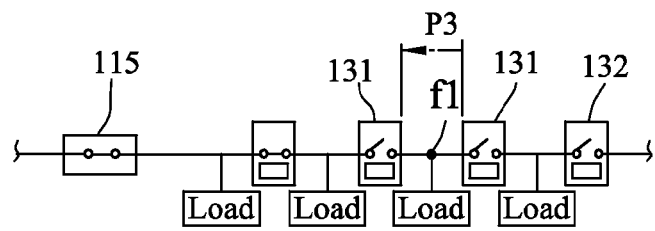
Figure 3D:
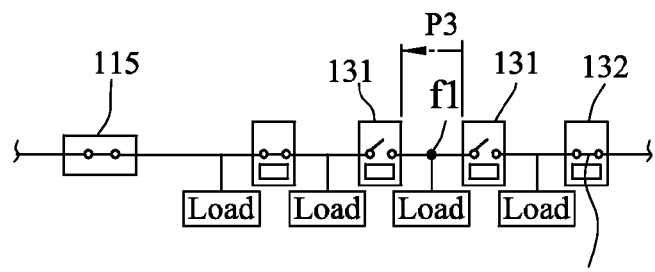

Step 65: The first FTU 112 causes the first CB 115 to make electrical connection, as shown in FIG. 3C, and causes the 2-way switch 134 of the second sub-switch unit 132 to make electrical connection, to thereby permit power transmission through the second sub-switch unit 132, as shown in FIG. 3D. Then, the flow goes to step 67.

Step 66: The first FTU 112 causes the first CB 115 to make electrical connection, as shown in FIG. 3C, and the flow goes to step 67.

Step 67: The analyzing module 2 makes an analysis for the fault location (f1) according to information (e.g., current information) collected thereby, and generates the analysis result that indicates whether or not the fault at the fault location (f1) has been fixed, which should be affirmative if the maintenance/repair at the fault location (f1) has been completed properly. The flow goes to step 68 when the analysis result indicates that the fault has been fixed, and goes back to step 67 when otherwise.

For example, the analyzing module 2 analyzes whether or not a third conduction path (P3) between the two of the first sub-switch units 131 that are most adjacent to the fault location (f1) normally conducts in order to generate the analysis result that indicates whether or not the fault has been fixed.

Step 68: The analyzing module 2 provides to the control module 3 the analysis result which indicates that the fault has been fixed.

Step 69: Upon receipt the measured result provided in step 68, the control module 3 controls the first FTU 112 to cause the 2-way switch(es) 134 of the first sub-switch unit(s) 131 that is(are) located most adjacent to the fault location (f1) to make electrical connections, to thereby permit power transmission through the first sub-switch unit(s) 131, and to cause the 2-way switch 134 of the second sub-switch unit 132 to break electrical connection, to thereby disable power transmission through the second sub-switch unit 132.

At this time, the first lateral 13 returns to the normal/faultless condition, as shown in FIG. 1 (ignoring the label f1).

As a result, by implementation of the distributed fault detection method using the embodiment of the power distribution system, occurrence of faults may be quickly identified via each FTU 112 detecting the corresponding 4-way switch unit 111, so that the subsequent FDIR process may be performed relatively promptly.

Figure 4:
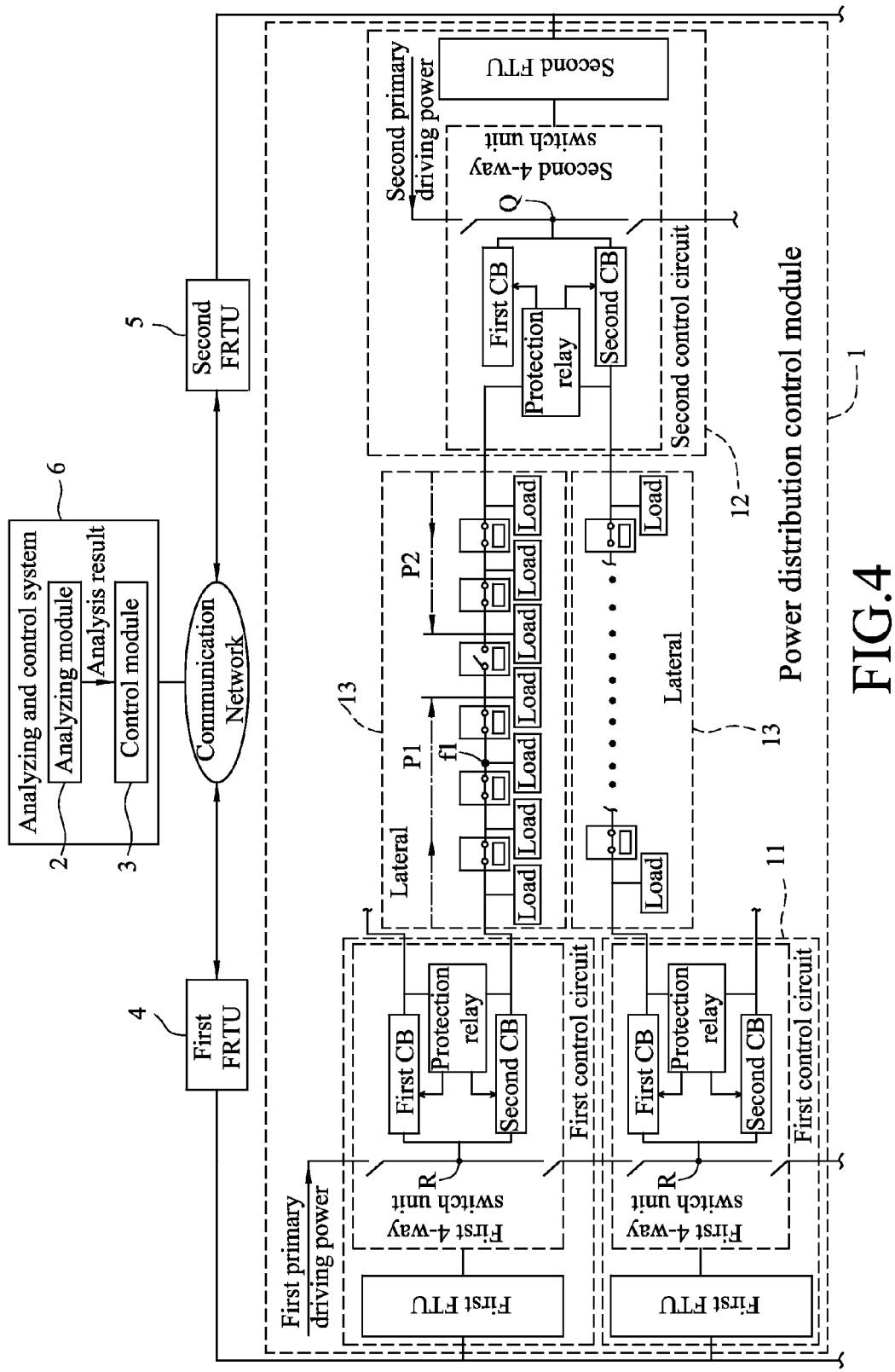
FIG. 4 is a fragmentary block diagram illustrating a first variation of the embodiment.

Referring to FIG. 4, a first variation of the embodiment of the power distribution system is shown to be similar to the embodiment depicted in FIG. 1, and differs therefrom in that M>N and L=2N, where M, N and L are respectively the numbers of the first control circuits 11, the second control circuits 12 and the laterals 13. In the depicted example of the first variation, M=2, N=1 and L=2, but this disclosure is not limited thereto.

When M>N, each of the first output terminal of a first one of the first control circuits 11 and the second output terminal of an $M^{th}$ one of the first control circuits 11 may be coupled to a corresponding circuit unit (not shown), which may be a lateral or other circuits. For other output terminals of the first control circuits 11, each first output terminal outputs the first driving power to the corresponding lateral 13, and each second output terminal outputs the second driving power to the corresponding lateral 13, where the first driving power and the second driving power are associated with the first primary driving power. The second control circuit 12 outputs to corresponding laterals 13 the third driving power and the fourth driving power respectively at the first and second output terminals thereof, where the third driving power and the fourth driving power are associated with the second primary driving power. The first and second terminals of a $(2i-1)^{th}$ one of the laterals 13 are respectively coupled to the second output terminal of an $i^{th}$ one of the first control circuits 11 and the first output terminal of an $i^{th}$ one of the second control circuit(s) 12 for respectively receiving the second driving power and the third driving power therefrom, where 1≤i≤N. The first and second terminals of a $(2i)^{th}$ one of the laterals 13 are respectively coupled to the first output terminal of an $(i+1)^{th}$ one of the first control circuits 11 and the second output terminal of the $i^{th}$ second control circuit 12 for respectively receiving the first driving power and the fourth driving power therefrom.

The first variation of the first embodiment of the power distribution system may implement the distributed fault detection method in a manner similar to that described hereinabove, and details are not repeated herein for the sake of brevity.

Figure 5:
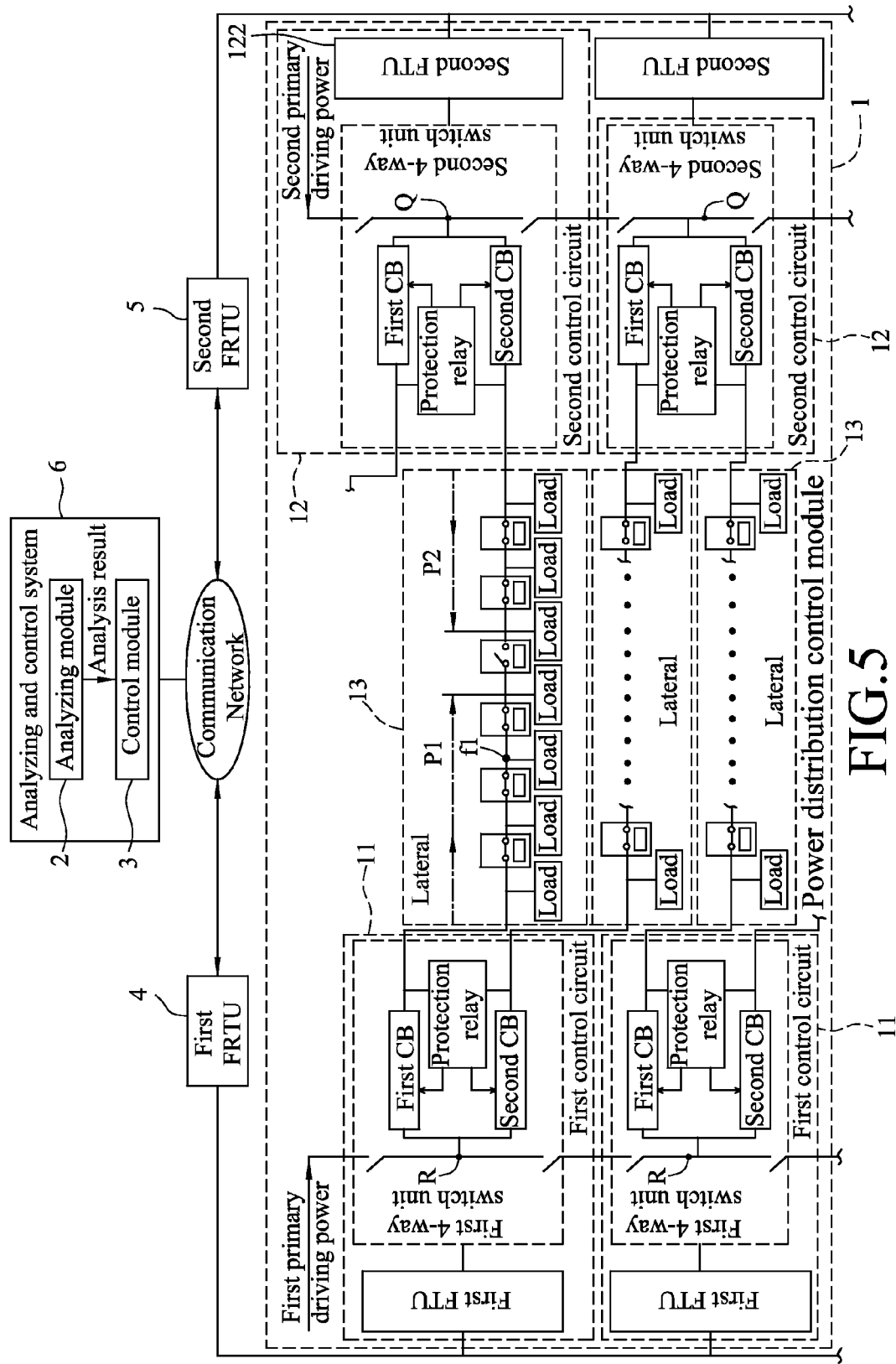
FIG. 5 is a fragmentary block diagram illustrating a second variation of the embodiment.

Referring to FIG. 5, a second variation of the embodiment of the power distribution system is shown to be similar to the embodiment depicted in FIG. 1, and differs therefrom in that M=N and L=2M-1. In FIG. 5, M=N>1, where M=2, N=2 and L=3, but this disclosure is not limited thereto.

When M=N>1, each of the first output terminal of a first one of the second control circuits 12 and the second output terminal of an $M^{th}$ one of the first control circuits 11 may be coupled to a corresponding circuit unit (not shown), which may be a lateral or other circuits. For other output terminals of the first control circuits 11, each first output terminal outputs the first driving power to the corresponding lateral 13, and each second output terminal outputs the second driving power to the corresponding lateral 13, where the first driving power and the second driving power are associated with the first primary driving power. For other output terminals of the second control circuits 12, each first output terminal outputs the third driving power to the corresponding lateral 13, and each second output terminal outputs the fourth driving power to the corresponding lateral 13, where the third driving power and the fourth driving power are associated with the second primary driving power. The first and second terminals of a $(2i-1)^{th}$ one of the laterals 13 are respectively coupled to the first output terminal of an $i^{th}$ one of the first control circuits 11 and the second output terminal of an $i^{th}$ one of the second control circuits 12 for respectively receiving the first driving power and the fourth driving power therefrom, where 1≤i≤N. The first and second terminals of a $(2i)^{th}$ one of the laterals 13 are respectively coupled to the second output terminal of the $i^{th}$ one of the first control circuits 11 and the first output terminal of an $(i+1)^{th}$ one of the second control circuits 12 for respectively receiving the second driving power and the third driving power therefrom.

Furthermore, when M=N=1 and L=1 (not shown), each of the first output terminal of the second control circuit 12 and the second output terminal of the first control circuit 11 may be coupled to a corresponding circuit unit, which may be a lateral or other circuits. The first output terminal of the first control circuit 11 and the second output terminal of the second control circuit 12 respectively output the first driving power and the fourth driving power to the lateral 13, where the first driving power and the fourth driving power are respectively associated with the first primary driving power and the second primary driving power. The first and second terminals of the lateral 13 are respectively coupled to the first output terminal of the first control circuit 11 and the second output terminal of the second control circuit 12 for respectively receiving the first driving power and the fourth driving power therefrom.

The second variation of the embodiment of the power distribution system may implement the distributed fault detection method in a manner similar to that described hereinabove, and details are not repeated herein for the sake of brevity.

Figure 6:
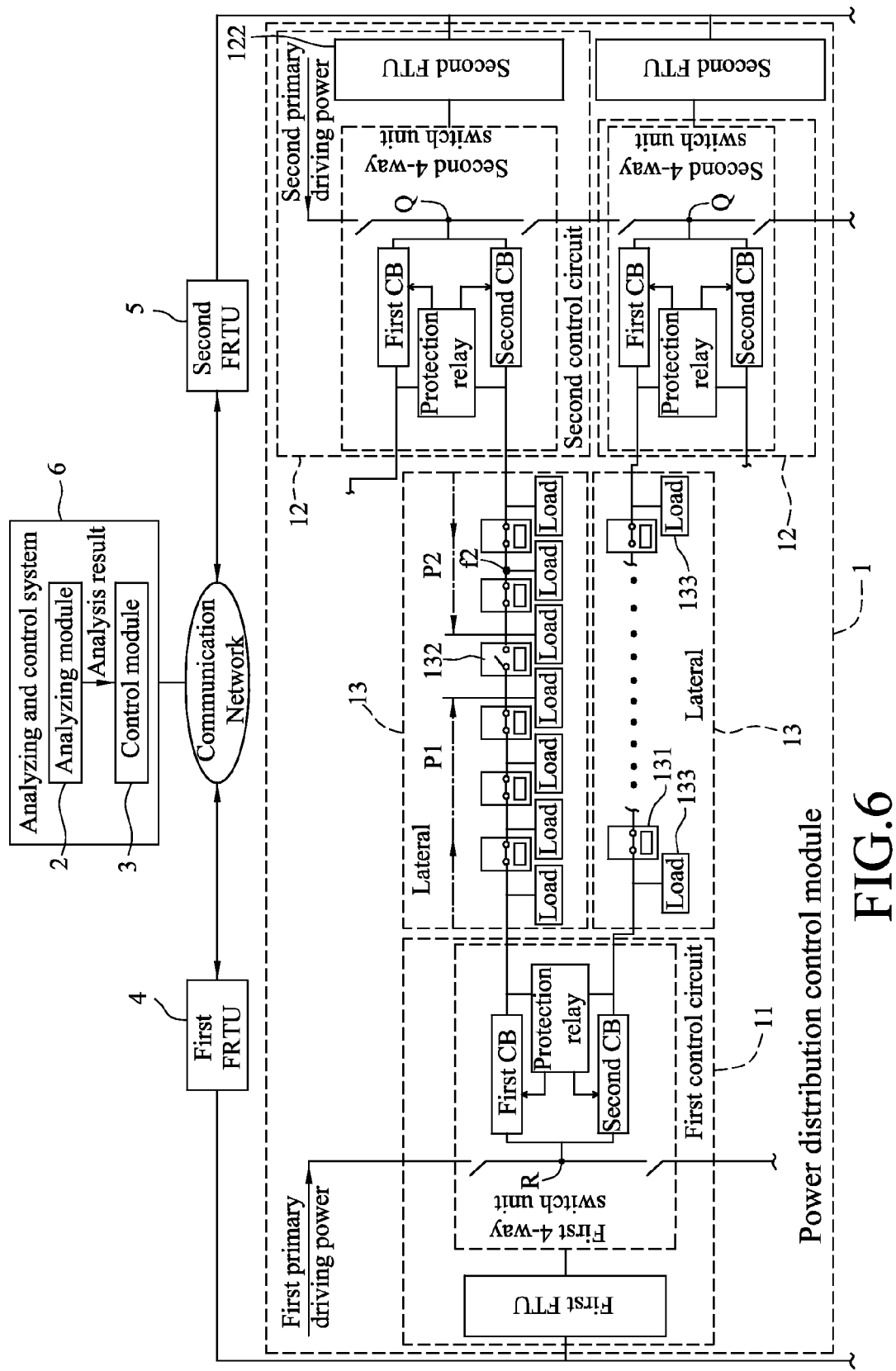
FIG. 6 is a fragmentary block diagram illustrating that the laterals of the embodiment is in a second exemplary condition.

Referring to FIG. 6, the laterals 13 of the embodiment of the power distribution system according to this disclosure are shown to be in a second exemplary condition, which is similar to the first exemplary condition and differs in that, instead of the fault location (f1) (see FIG. 1), a fault occurs at the fault location (f2), which is in the second conduction path (P2).

Each second control circuit 12 may perform the above-mentioned distributed fault detection method in a manner similar to that described for the first control circuit 11 in the first exemplary condition, and the details are not repeated herein for the sake of brevity.

In summary, the power distribution system of this disclosure may quickly identify the occurrence of a fault so as to perform FDIR on the lateral 13 at which the fault occurs. Since each of the control circuits 11, 12 has the FTU (FTU) 112, 122 to control operations of the corresponding 4-way switch unit 111, 121 and lateral(s) 13, the fault at any lateral 13 may be easily detected via the FTUs 112, 122 detecting the corresponding 4-way switch units 111, 112, facilitating prompter subsequent FDIR on the faulted lateral 13. As a result, time between occurrence of a fault till completion of the FDIR is reduced. In addition, since each of the 4-way switch units 111, 121 and the laterals 13 is controlled by the corresponding control circuits 11, 12, a relatively simpler program design for the analyzing and control system 6 is sufficient in comparison to the conventional power distribution system in which all of the 4-way switch units and the laterals are directly controlled by the SCADA system.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A power distribution system comprising:
at least one power distribution control module including:
at least one lateral; and
at least one first control circuit that includes:
a first switch unit including:
a first circuit breaker coupled to said at least one lateral for transmitting electrical power to said at least one lateral when making electrical connection; and
a protection relay coupled to said first circuit breaker, and configured to detect whether or not a magnitude of a first current provided by said first circuit breaker is greater than a first threshold current value, and to generate, upon determining that the magnitude of the first current is greater than the first threshold current value, a first control signal that is provided to said first circuit breaker and that causes said first circuit breaker to break electrical connection; and
a first feeder terminal unit (FTU) coupled to said first switch unit, configured to detect whether or not said protection relay generates the first control signal, and determining whether or not said at least one lateral has a fault according to the detection.

2. The power distribution system according to claim 1, wherein:
said at least one lateral includes a plurality of first sub-switch units that are divided into a first switch group and a second switch group, and a second sub-switch unit, each of said first and second sub-switch units being configured to generate a fault detection signal that indicates an operation condition thereof;
for each of said first and second switch groups, said first sub-switch units thereof are coupled to each other one by one;
said second sub-switch unit interconnects a terminal of said first sub-switch units of said first switch group and a terminal of said first sub-switch units of said second switch group;
each of said first sub-switch units permits power transmission therethrough and said second sub-switch unit disables power transmission therethrough when said lateral operates in a normal condition;
said first FTU is further configured to, upon detecting that said protection relay generates the first control signal, determine a fault location of said at least one lateral at which the fault occurs according to the fault detection signal generated by each of said first and second sub-switch units before said first circuit breaker breaks electrical connection;
said first FTU is further configured to, when at least one of said first sub-switch units is located between the fault location and said second sub-switch unit, cause two of said first sub-switch units that are located most adjacent to the fault location to disable power transmission therethrough, cause said first circuit breaker to make electrical connection, and cause said second sub-switch unit to permit power transmission therethrough.

3. The power distribution system according to claim 2, wherein:
each of said first sub-switch units and said second sub-switch unit includes a switch, and a lateral terminal unit (LTU) configured to detect current information associated with said switch, and to generate the fault detection signal according to the current information thus detected; and
said switch of each of said first sub-switch units and said second sub-switch unit is coupled to said switch of at least one of said second sub-switch unit and another one of said first sub-switch units.

4. The power distribution system according to claim 2, wherein said first FTU is further configured to, when none of said first sub-switch units is located between the fault location and said second sub-switch unit, cause one of said first sub-switch units that is located most adjacent to the fault location to disable power transmission therethrough, and cause said first circuit breaker to make electrical connection.

5. The power distribution system according to claim 2, further comprising:
an analyzing module coupled to said at least one power distribution control module, and configured to make an analysis at the fault location, and to generate an analysis result that indicates whether or not the fault at the fault location has been fixed;
a control module coupled to said analyzing module for receiving the analysis result therefrom, and configured to, when the analysis result indicates that the fault at the fault location has been fixed, control said first FTU to cause said two of said first sub-switch units that are located most adjacent to the fault location to permit power transmission therethrough, and to cause said second sub-switch unit to disable power transmission therethrough.

6. The power distribution system according to claim 1, wherein said at least one lateral includes two laterals, said first circuit breaker is coupled to one of said laterals, and said first switch unit further includes a second circuit breaker coupled to another one of said laterals for transmitting electrical power to said another one of said laterals when making electrical connection.

7. The power distribution system according to claim 6, wherein said protection relay is further coupled to said second circuit breaker, and is further configured to detect whether or not a magnitude of a second current provided by said second circuit breaker is greater than a second threshold current value, and to generate, upon determining that the magnitude of the second current is greater than the second threshold current value, a second control signal that is provided to said second circuit breaker and that causes said second circuit breaker to break electrical connection.

8. The power distribution system according to claim 1, wherein said at least one power distribution control module further includes at least one second control circuit that includes:
a second switch unit including:
a circuit breaker coupled to said at least one lateral for transmitting electrical power to said at least one lateral when making electrical connection; and
a protection relay coupled to said second circuit breaker, and configured to detect whether or not a magnitude of a second current provided by said second circuit breaker is greater than a second threshold current value, and to generate, upon determining that the magnitude of the second current is greater than the second threshold current value, a second control signal that is provided to said circuit breaker and that causes said circuit breaker to break electrical connection; and a second FTU coupled to said second switch unit, and configured to detect whether or not said protection relay of said second switch unit generates the second control signal, so as to determine whether or not said at least one lateral has a fault.

9. The power distribution system according to claim 8, wherein said first circuit breaker of said first switch unit and said circuit breaker of said second switch unit are coupled to different terminals of said at least one lateral.

10. A fault detection method for a power distribution system that includes at least one lateral and at least one power distribution control module including a first switch unit and a first feeder terminal unit (FTU), the first switch unit including a first circuit breaker coupled to the at least one lateral, and a protection relay coupled to the first circuit breaker, said fault detection method comprising the steps of:
  a) detecting, by the protection relay, whether or not a magnitude of a first current provided by the first circuit breaker is greater than a first threshold current value;
  b) generating, by the protection relay, a first control signal that is provided to the first circuit breaker and that causes the first circuit breaker to break electrical connection upon determining that the magnitude of the first current is greater than the first threshold current value in step a);
  c) determining, by the first FTU, whether or not a fault has occurred in said at least one lateral by detecting whether or not the protection relay generates the first control signal.

11. The fault detection method according claim 10, the at least one lateral including a plurality of first sub-switch units that are divided into a first switch group and a second switch group, and a second sub-switch unit; for each of the first and second switch groups, the first sub-switch units thereof being coupled to each other one by one; the second sub-switch unit interconnecting a terminal of the first sub-switch units of the first switch group and a terminal of the first sub-switch units of the second switch group; each of the first sub-switch units permitting power transmission therethrough and the second sub-switch unit disabling power transmission therethrough when the lateral operates in a normal condition; said fault detection method further comprising the steps of:
  d) upon detecting in step c) that the protection relay generates the first control signal, determining, by the first FTU, a fault location of said at least one lateral at which the fault occurs according to a fault detection signal generated by each of the first and second sub-switch units before the first circuit breaker breaks electrical connection;
  e) when at least one of the first sub-switch units is located between the fault location and the second sub-switch unit, causing, by the first FTU, two of the first sub-switch units that are located most adjacent to the fault location to disable power transmission therethrough, causing the first circuit breaker to make electrical connection, and causing the second sub-switch unit to permit power transmission therethrough.

12. The fault detection method according claim 11, each of the first sub-switch units and the second sub-switch unit including a switch, and a lateral terminal unit (LTU), the switch of each of the first sub-switch units and the second sub-switch unit being coupled to the switch of at least one of the second sub-switch unit and another one of the first sub-switch units, said fault detection method further comprising:
  for each of the first sub-switch units and the second sub-switch unit, detecting, by the LTU, current information associated with the switch, and generating the fault detection signal according to the current information thus detected.

13. The fault detection method according claim 11, further comprising the step of:
  f) when none of the first sub-switch units is located between the fault location and the second sub-switch unit, causing, by the first FTU, one of the first sub-switch units that is located most adjacent to the fault location to disable power transmission therethrough, and causing the first circuit breaker to make electrical connection.

14. The fault detection method according claim 11, the power distribution further including an analyzing module coupled to the at least one power distribution control module, and a control module coupled to the analyzing module, said fault detection method further comprising the steps of:
  g) making an analysis, by the analyzing module, at the fault location, and determining whether or not the fault at the fault location has been fixed based on the analysis;
  h) generating, by the analyzing module, an analysis result that indicates that the fault at the fault location has been fixed when a result of the determination in step g) is affirmative;
  i) controlling, by the control module, the first FTU to cause the two of the first sub-switch units that are located most adjacent to the fault location to permit power transmission therethrough, and cause the second sub-switch unit to disable power transmission therethrough upon receipt the analysis result generated in step g).

\* \* \* \* \*